US010362861B1

(12) United States Patent
Patton et al.

(10) Patent No.: US 10,362,861 B1
(45) Date of Patent: Jul. 30, 2019

(54) LEG LATCHING DEVICE FOR A TABLE, AND A TABLE INCORPORATING SAME

(71) Applicant: Varidesk, LLC, Coppell, TX (US)

(72) Inventors: David Patton, Flower Mound, TX (US); Lio Yenwei Chang, Lewisville, TX (US); David Burnett, Hurst, TX (US); Ian Williams, Grapevine, TX (US); Michael Creighton, Warrington, PA (US); Ersen Boran, Chalfont, PA (US); Shuichi Amano, Bethlehem, PA (US); Gary Reuther, Warminster, PA (US); Nicholas Max, Quakertown, PA (US)

(73) Assignee: Varidesk, LLC, Coppell, TX (US)

( * ) Notice: Subject to any disclaimer, the term of this patent is extended or adjusted under 35 U.S.C. 154(b) by 0 days.

(21) Appl. No.: 15/880,262

(22) Filed: Jan. 25, 2018

(51) Int. Cl.
*A47B 13/02* (2006.01)
*A47B 3/06* (2006.01)
*F16B 12/44* (2006.01)
*A47B 13/00* (2006.01)

(52) U.S. Cl.
CPC ............. *A47B 13/021* (2013.01); *A47B 3/06* (2013.01); *A47B 13/003* (2013.01); *F16B 12/44* (2013.01); *A47B 2013/022* (2013.01)

(58) Field of Classification Search
CPC ... A47B 2013/002; A47B 13/003; A47B 3/06; F16B 12/42
USPC .......... 108/159.11, 154, 157.15, 156, 157.1, 108/157.16, 159; 248/188, 188.1, 188.91, 248/220.1, 220.21, 220.22, 220.11, 248/220.13
See application file for complete search history.

(56) References Cited

U.S. PATENT DOCUMENTS

| 554,578 | A | * | 2/1896 | Broughton | A47B 13/021 248/188 |
| 577,229 | A | * | 2/1897 | Bosch | A47B 13/021 248/188 |
| 2,143,542 | A | * | 1/1939 | Clarin | F16B 12/46 248/188 |
| 3,327,658 | A | * | 6/1967 | Schreyer | A47B 13/021 108/156 |
| 3,341,160 | A | * | 9/1967 | Jones, III | A47B 13/06 108/156 |
| 3,399,912 | A | * | 9/1968 | Pierluigi | F16B 12/46 144/353 |
| 3,479,975 | A | * | 11/1969 | Handler | A47B 57/20 108/147.12 |
| 3,572,787 | A | * | 3/1971 | Timmerman | F16B 12/44 108/156 |

(Continued)

FOREIGN PATENT DOCUMENTS

| EP | 1913841 A1 | 4/2008 |
| KR | 20170055192 A | 5/2017 |
| WO | 2016130995 A1 | 8/2016 |

*Primary Examiner* — Jose V Chen
(74) *Attorney, Agent, or Firm* — Venable LLP; Michele V. Frank

(57) ABSTRACT

A table having a table top, a bracket secured to the table top, a latching device coupled to the bracket, the latching device having a retaining wedge coupled to a draw latch via a cam device, and a table leg. The draw latch is configured to move the retaining wedge between a first position securing the table leg to the bracket and a second position unsecuring the table leg from the bracket.

19 Claims, 12 Drawing Sheets

(56) References Cited

U.S. PATENT DOCUMENTS

| | | | | |
|---|---|---|---|---|
| 3,590,753 A | * | 7/1971 | Blink | A47B 3/06 108/155 |
| 3,620,176 A | * | 11/1971 | Ferdinand et al. | A47B 57/18 108/157.13 |
| 3,981,251 A | * | 9/1976 | Damberg | A47B 57/18 108/154 |
| 4,085,916 A | | 4/1978 | Pedersen | |
| 4,396,173 A | * | 8/1983 | Call, Sr. | F16B 12/14 248/188 |
| 4,432,590 A | * | 2/1984 | Lawrence | A47B 47/04 108/156 |
| 4,561,622 A | | 12/1985 | Heinzel | |
| 4,585,365 A | * | 4/1986 | Manno | F16B 12/20 108/153.1 |
| 4,846,079 A | * | 7/1989 | Ajax | A47B 13/021 108/156 |
| 4,892,044 A | * | 1/1990 | Welsch | A47B 57/54 108/147.14 |
| 5,074,224 A | * | 12/1991 | Stascheit | E04H 3/28 108/156 |
| 5,232,303 A | | 8/1993 | Wilkening | |
| 5,244,271 A | * | 9/1993 | Hackwood | A47B 13/021 108/156 |
| 5,377,601 A | | 1/1995 | Cashen | |
| 5,498,073 A | * | 3/1996 | Charbonneau | H02B 1/01 312/257.1 |
| 5,577,451 A | * | 11/1996 | Yeh | A47B 13/021 108/156 |
| 5,662,298 A | | 9/1997 | Collins | |
| 5,845,589 A | | 12/1998 | Pfister | |
| 5,934,630 A | | 8/1999 | Williams et al. | |
| 6,017,008 A | | 1/2000 | Farley | |
| 6,047,648 A | | 4/2000 | Alm et al. | |
| 6,394,005 B1 | | 5/2002 | Isensee et al. | |
| 6,543,960 B1 | | 4/2003 | Heid et al. | |
| 7,223,041 B1 | | 5/2007 | Heid et al. | |
| 7,288,117 B2 | | 10/2007 | Benson | |
| 8,215,246 B2 | * | 7/2012 | Quam | E04H 3/28 108/156 |
| 8,459,734 B2 | | 6/2013 | Herschler | |
| 8,876,073 B2 | * | 11/2014 | Richey | F16B 12/00 248/200 |
| 8,936,065 B1 | * | 1/2015 | Gillespie | B44D 3/185 160/371 |
| 2011/0120352 A1 | | 5/2011 | Marallo et al. | |

* cited by examiner

LEG LATCHING DEVICE FOR A TABLE, AND A TABLE INCORPORATING SAME

TECHNICAL FIELD

The present application relates to a latching device and related methods. More specifically, the present application relates to a latching device for quickly installing and removing legs, for example, on a table or desk.

BACKGROUND

Existing tables that may be assembled or disassembled often require tools and many fasteners to secure legs to the table. This process may be time consuming and cumbersome. The process may require several users to construct the table. Improvements to this process generally involve foldable table legs which are permanently secured to the table top. With these tables, the table legs may be folded into and out of the standing position. However, a need exists for a table which may be constructed without tools by a single user while still allowing for the compact storage and transportation of the table.

SUMMARY

According to an embodiment, a table may include a table top; a bracket secured to the table top; a latching device coupled to the bracket, the latching device having a retaining wedge coupled to a draw latch via a cam device; and a table leg. The draw latch may be configured to move the retaining wedge between a first position securing the table leg to the bracket and a second position unsecuring the table leg from the bracket.

According to an embodiment, a latching device may include a bracket; a draw latch defining a cam surface; a cam follower in contact with the cam surface; and a retaining wedge coupled to the draw latch by a shaft passing through an aperture in the bracket. The draw latch may be configured to move the retaining wedge between a first position spaced a first distance from the bracket to a second position spaced a second distance from the bracket.

According to an embodiment, a method for securing a leg to a table may include providing a table top having a bracket and a latching device coupled to the bracket; aligning a table leg with a retaining wedge of the latching device; lowering the table leg onto the retaining wedge, whereby the retaining wedge enters a hollow interior portion of the table leg; and moving a draw latch of the latching device to a secured position to engage the table leg between the retaining wedge and the bracket.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention.

Embodiments of the present invention relate to a collapsible table which may be quickly and easily assembled and disassembled, for example, by a single user with no tools. The table may include a latching device which uses a camming connection to engage and disengage a retaining wedge. The retaining wedge may be movable by the camming connection to a first position which allows the table leg to be inserted or removed from the latching device and to a second position which prevents the table leg from being moved, removed, or inserted into the latching device. In this manner, the table legs may be attached or detached from the table at any time by a user.

Figure 1:
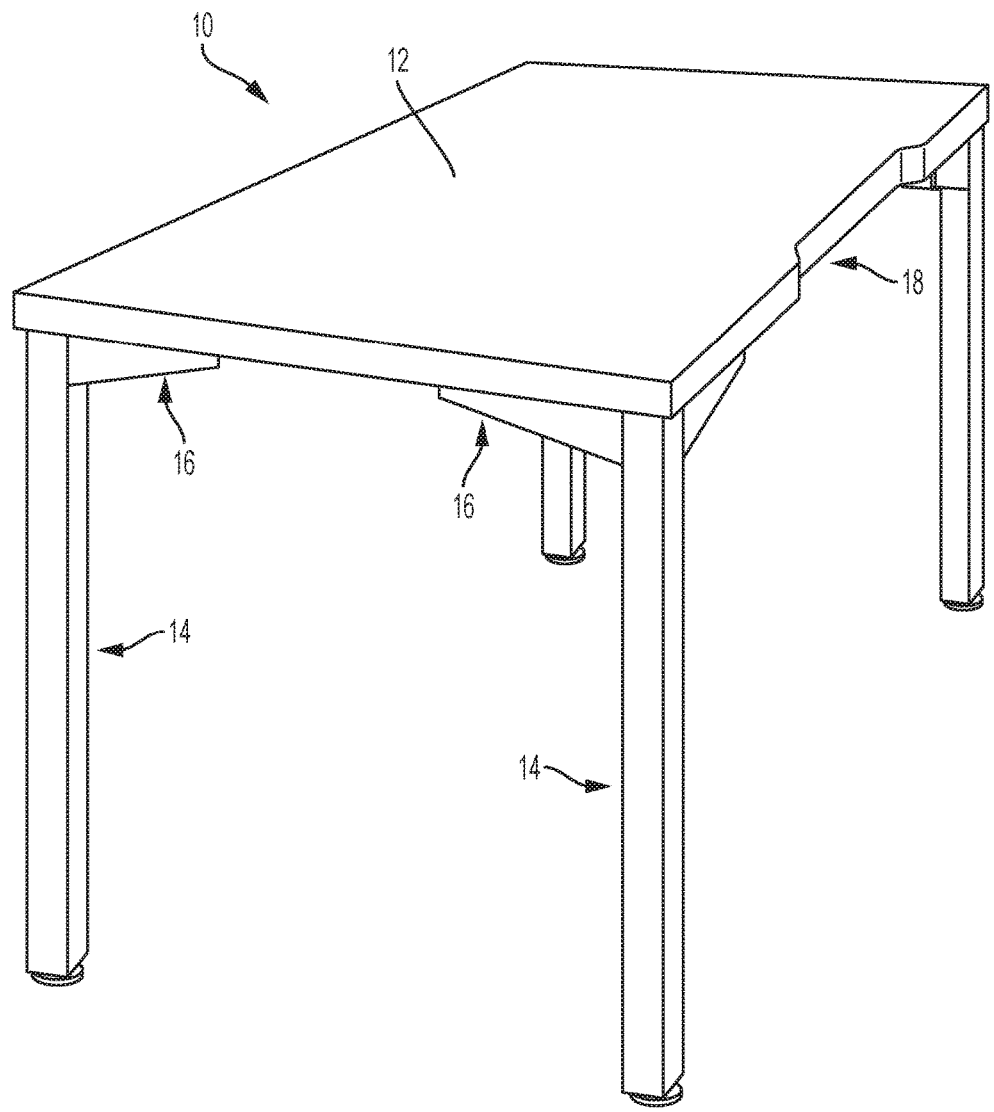
FIG. 1 is a perspective view of a table, according to an embodiment.
Figure 2:
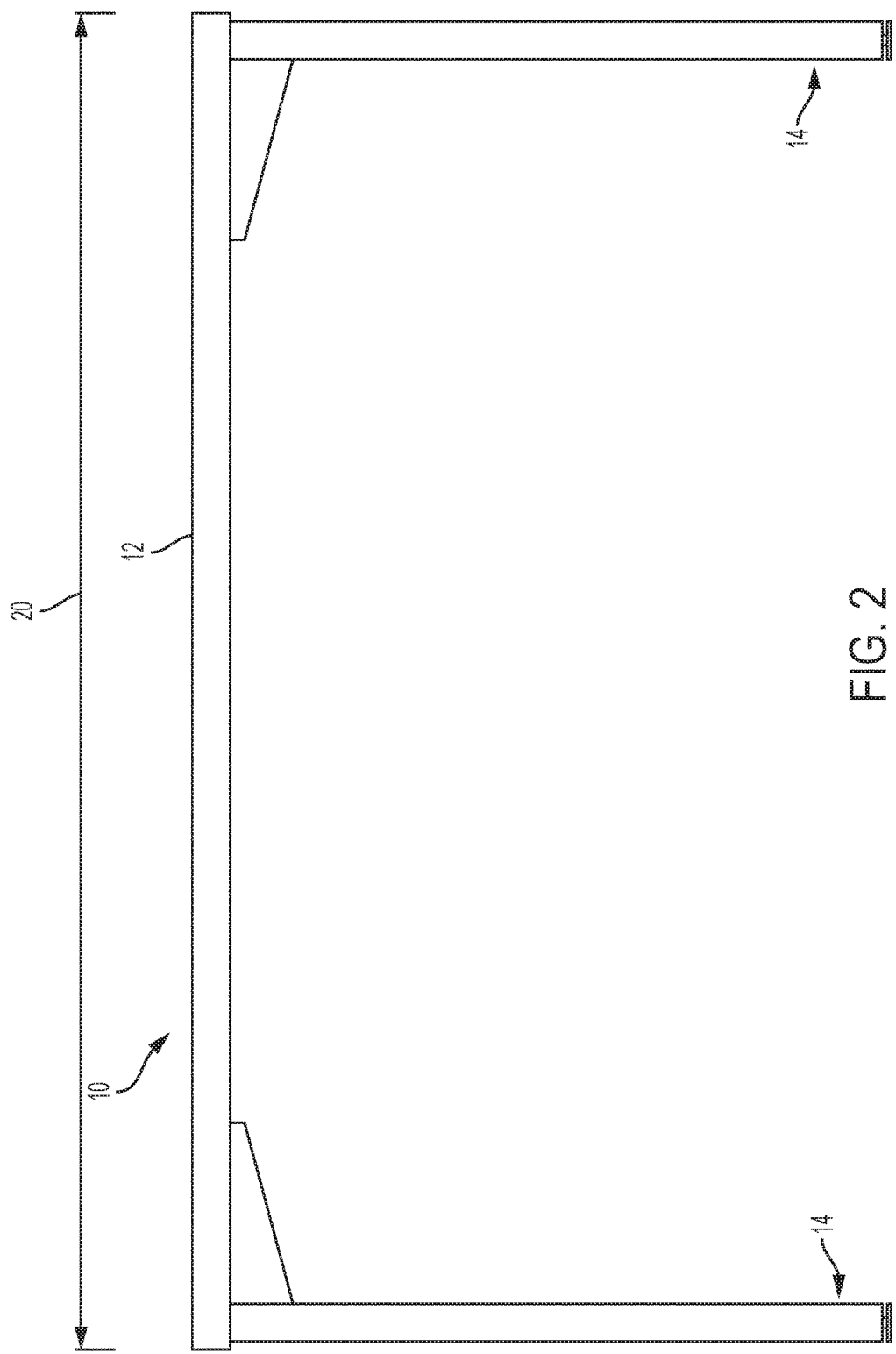
FIG. 2 is a front view of the table of FIG. 1.
Figure 3:
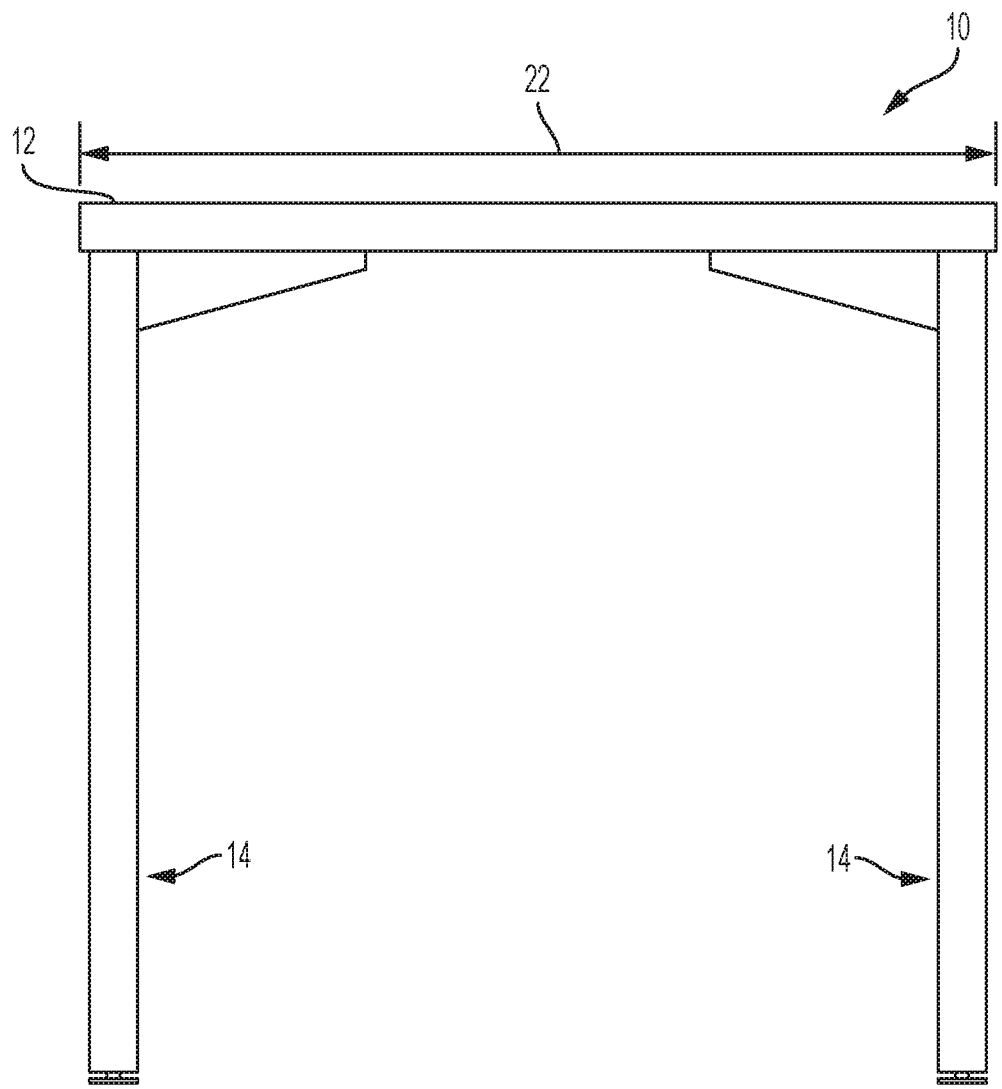
FIG. 3 is an end view of the table of FIG. 1.

Referring to FIGS. 1-3, a table 10 according to an embodiment of the disclosure is shown. The table 10 may include a table top 12 and one or more table legs 14. The one or more table legs 14 may be coupled to the table top 12 with a latching device 16, such as a leg latching device, to be explained in more detail to follow. The table 10 may include a recess 18. The recess 18 may accommodate a person sitting or standing at the table 10 during use. Although four table legs 14 are depicted, more or fewer legs may be provided.

As may be appreciated from FIGS. 1-3, the table 10 may be generally rectangular having a length 20 (FIG. 2) that is longer than a width 22 (FIG. 3). Alternatively, the table may be other shapes, for example, square, elongated, oval, elliptical, circular, polygonal, etc. The table may be, for example, a desk, a conference table, a standing table, a coffee table, a console table, an outdoor table, or other type of table. The table top 12 may comprise, for example, wood, plastic, metal, composite, laminate, stone, marble, concrete, glass, or other materials.

Figure 4:
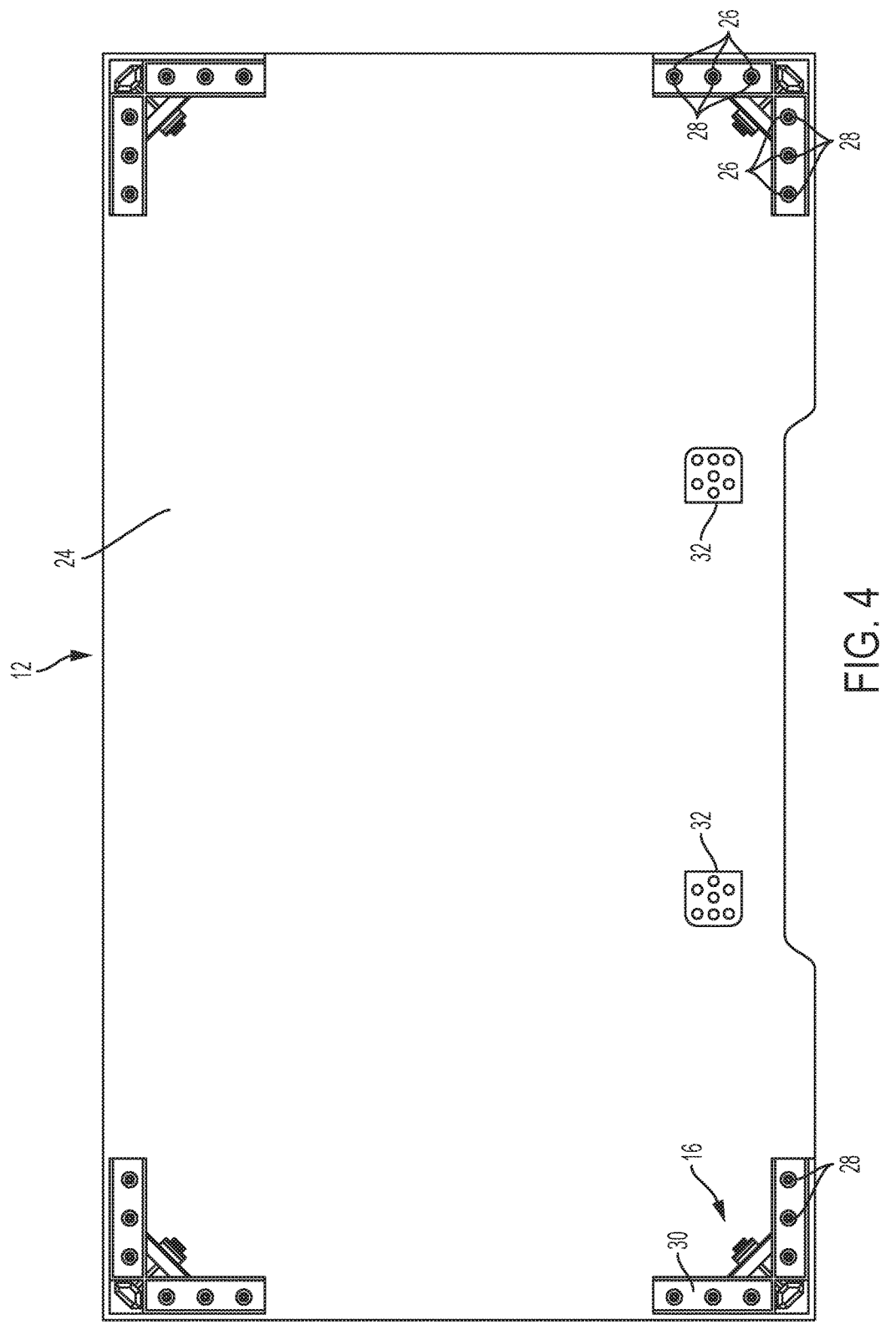
FIG. 4 is a bottom view of the table of FIG. 1, shown with the legs removed.

Referring to FIG. 4, a bottom view of the table top 12 of the table 10 (FIG. 1) is shown with the one or more table legs 14 (FIG. 1) removed. The table top 12 may have a lower surface 24 to which the latching devices 16 are coupled. Each latching device 16 may include a bracket 30. The bracket 30 may be aligned substantially with the corners of the table top 12. The number of latching devices 16 may be selected to correspond to the number of table legs 14 (FIG. 1) provided with the table 10 (FIG. 1). The brackets 30 of latching devices 16 may have apertures 26 which correspond to apertures (not depicted) on the lower surface 24 of the table top 12. Fasteners 28 may be installed into the apertures 26 in brackets 30 and into the apertures on the lower surface 24. The fasteners 28 may couple the brackets 30, and thus the latching devices 16, to the lower surface 24 of the table top 12. Although six apertures 26 and corresponding fasteners 28 are depicted for each bracket 30, more or fewer apertures 26 and fasteners 28 may be provided. The fasteners 28 may be, for example, screws, bolts, pins, nails, etc. Alternatively, and without limitation, the brackets 30 may be attached to the table top 12 by bonding or welding, or may be co-formed with the table top 12. The table top 12 may include additional brackets 32 secured to the lower surface 24. The additional brackets 32 may provide a connection for a tray or other component at a rear of the table. The tray may hold, collect, or otherwise accommodate cords, cables, wires, power cords, signal cables, etc.

Figure 5:
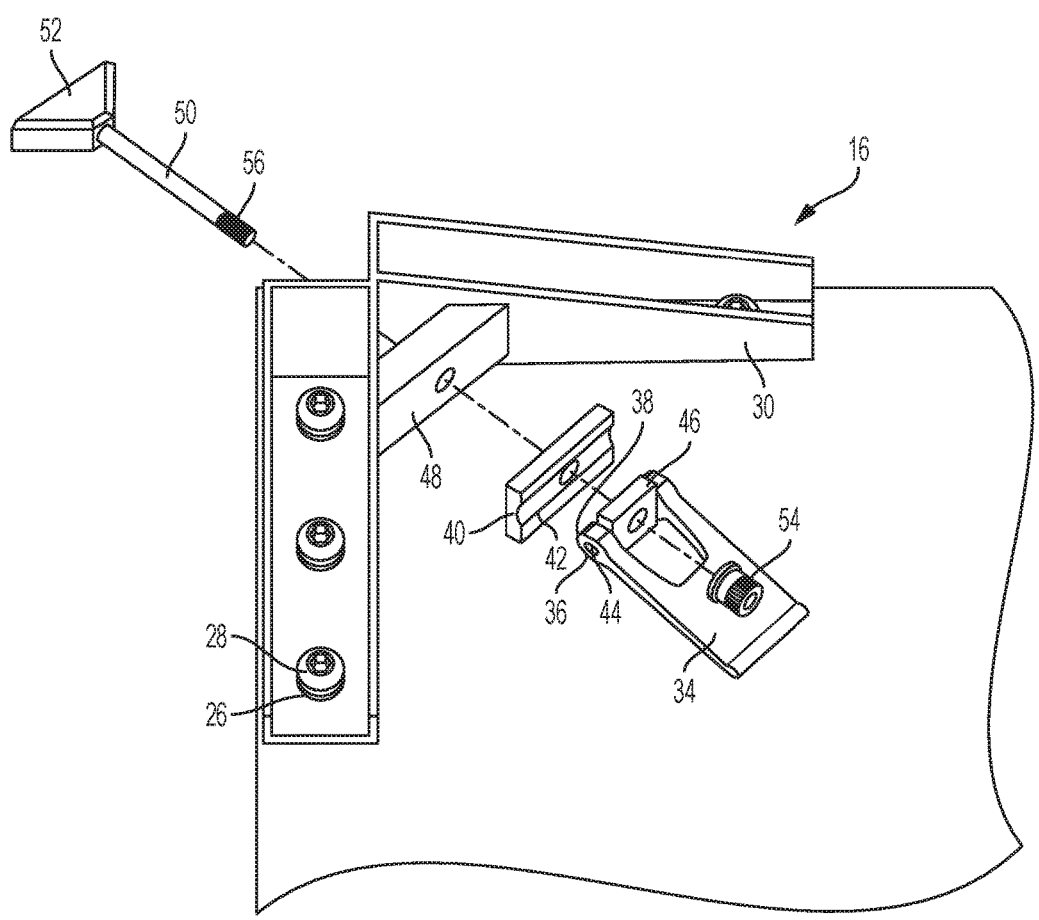
FIG. 5 is an exploded view of a latching device for the table of FIG. 1.

Referring to FIG. 5, an exploded view of the latching device 16 is shown. As previously described, the latching device 16 may include a bracket 30 having apertures 26. The bracket 30 may be secured to the table top 12 (FIG. 4) with fasteners 28 inserted into apertures 26. The latching device 16 may include a draw latch 34 which may be operable (e.g., pivotable) between a secured (FIG. 11) and unsecured (FIG. 10) position, as will be described in more detail to follow. The bracket 30 may include a block 48 for coupling the draw latch 34 to the bracket 30. A shaft 50 may be inserted in an aperture in the block 48 and through corresponding apertures in a cam follower 40 and a draw latch block 46. A tensioning knob 54 may be provided on a threaded surface 56 at an end of the shaft 50. The tensioning knob 54 may secure the shaft 50 to the draw latch 34. The tensioning knob 54 may also allow for adjustment of the position of the draw latch 34, as will be described in more detail to follow. Block 48 may be permanently affixed to bracket 30. As may be appreciated, the shaft 50 passing through the aperture in block 48 allows the draw latch 34 to move a retaining wedge 52 relative to bracket 30.

Figure 6:
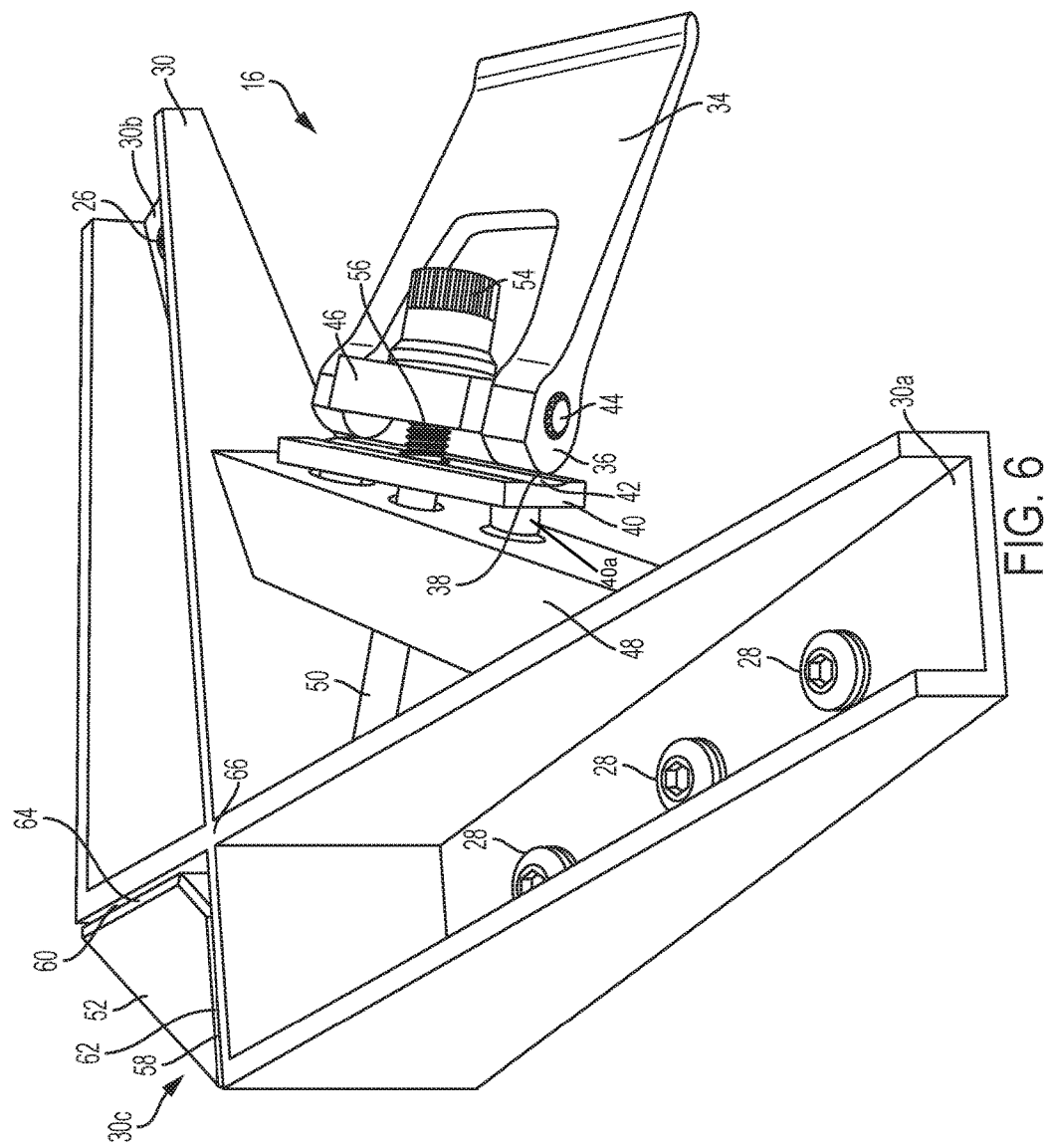
FIG. 6 is a perspective view of the latching device of FIG. 5.

With continued reference to FIG. 5, the cam follower 40 may have a cam follower surface 42. The cam follower 40 may be pressed between block 48 and draw latch block 46 to cause the cam follower 40 to be substantially stationary. As seen in FIG. 6, the cam follower 40 may have one or more pins 40a received in corresponding openings (unlabeled) of the block 48. The pins 40a may retain the cam follower 40 in place against the block 48. The pins 40a may retain the cam surface 42 in alignment with the cam surface 38. The pints 40a may prevent rotation or skewing of the cam follower 40 with respect to the enlarged portion 36. Referring back to FIG. 5, the cam follower 40 may be secured to the block 48 via shaft 50 and tensioning knob 54. The cam follower surface 42 on the cam follower 40 may correspond to a cam surface 38 on the draw latch 34, for example, on an enlarged portion 36 of the draw latch 34. During operation, movement of the draw latch 34 may cause the cam surface 38 to rotate with respect to the cam follower surface 42 to provide movement of the retaining wedge 52 between the secured and unsecured positions.

The rotation of draw latch 34 may be provided by a pin 44 inserted through a transverse axis of the draw latch 34. The enlarged portion 36 may have a curved outer surface which corresponds to the cam surface 38. The cam surface 38 may be eccentrically disposed with respect to the pin 44 in order to create the cam profile of cam surface 38. The cam follower surface 42 may have a curvature that mates or substantially conforms with the cam surface 38. As will be described in more detail, as the draw latch 34 is moved to rotate the cam surface 38 within the cam follower surface 42, the retaining wedge 52 may be moved between secured (FIG. 11) and unsecured (FIG. 10) positions. Although curved surfaces are depicted on the cam surface 38 and cam follower surface 42, it will be appreciated that alternative surfaces may be provided so long as one surface moves eccentrically with respect to the other to create relative movement therebetween. Additionally, alternative cam arrangements may be provided that create relative movement, including rotational or linear movement, between the draw latch 34 and the cam follower 40. The latching device 16, including the draw latch 34, tensioning knob 54, latch block 46, pin 44, cam follower 40, block 48, shaft 50, and/or retaining wedge 52 may comprise, for example, plastic, metal, composite, other materials, or any combination thereof. The components of the latching device 16 may be of the same material or different material.

As may be appreciated from FIG. 6, the bracket 30 of latching device 16 may be substantially L-shaped. As such, the bracket 30 may have a first bracket portion 30a and a second bracket portion 30b joined by a corner bracket portion 30c. The first bracket portion 30a and the second bracket portion 30b may be connected by a corner 66. The first bracket portion 30a and second bracket portion 30b may be perpendicular or substantially perpendicular with respect to each other, although other angular relationships are contemplated. Although a substantially L-shaped bracket is depicted, alternative shapes of bracket 30 are contemplated so long as the bracket 30 may accommodate the remaining components of the latching device 16, such as retaining wedge 52, shaft 50, draw latch 34, and associated components. The bracket 30 may comprise, for example, plastic, metal, composite, other materials, or any combination thereof.

The corner bracket portion 30c may be substantially flat and may join the first bracket portion 30a to the second bracket portion 30b. The corner bracket portion 30c may define a corner recess for receipt of the table leg 14. The corner bracket portion 30c and associated corner recess may also accommodate the retaining wedge 52. When assembled, a top surface of the retaining wedge 52 may be substantially aligned and co-planar with a top surface of the first and second bracket portions 30a and 30b. A bottom surface of the retaining wedge 52 may by parallel and offset from a top surface of the corner bracket portion 30c. Thus, as may be appreciated, the retaining wedge 52 may nest within the corner recess defined by corner bracket portion 30c of the bracket 30. The bracket 30 may include a first surface 58 on an end of the first bracket portion 30a and a second surface 60 on the second bracket portion 30b. The retaining wedge 52 may include a first retaining surface 62 and a second retaining surface 64 aligned with the surfaces 58 and 60, respectively. The first surface 58 may be substantially parallel to and aligned with the first retaining surface 62. The second surface 60 may be substantially parallel to and aligned with the second retaining surface 64. During operation of the latching device 16, the retaining wedge 52 may be moved between a first position where the first retaining surface 62 and second retaining surface 64 are offset a first distance from the first surface 58 and second surface 60, respectively, and a second position where the first and second retaining surfaces 62, 64 are offset from the first and second surfaces 58, 60, respectively, at second distance. The first distance may be smaller than the second distance. At the first distance, a component, such as a table leg, may be pressed or sandwiched between the respective surfaces of the retaining wedge 52 and bracket 30 such that movement is prevented. At the second distance, the component may be released such that the component is moveable (e.g., removable) with respect to the retaining wedge 52 and bracket 30. The movement between these positions may be provided by moving the draw latch 34 between a first position and a second position, as will be explained in more detail.

Figure 7:
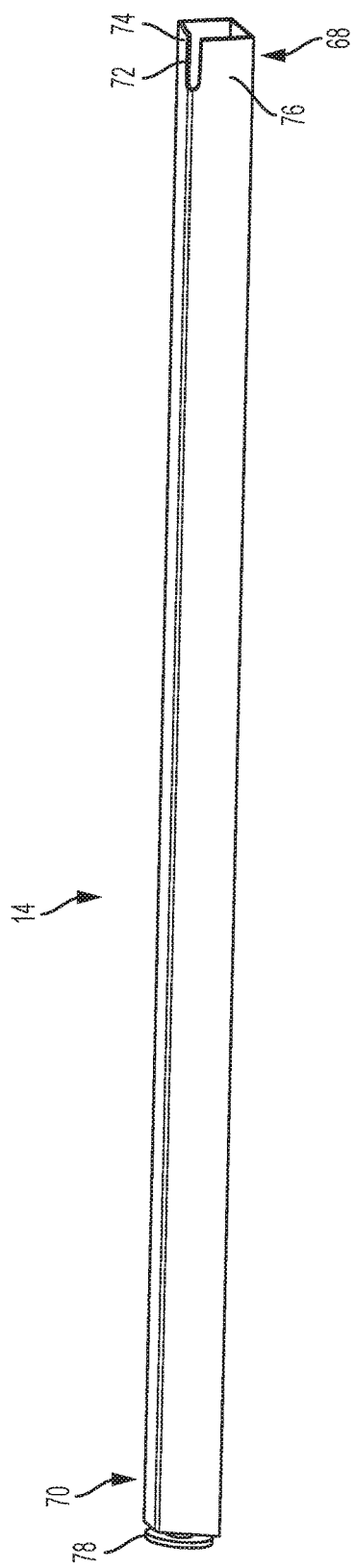
FIG. 7 is a perspective view of a leg of the table of FIG. 1.
Figure 8:
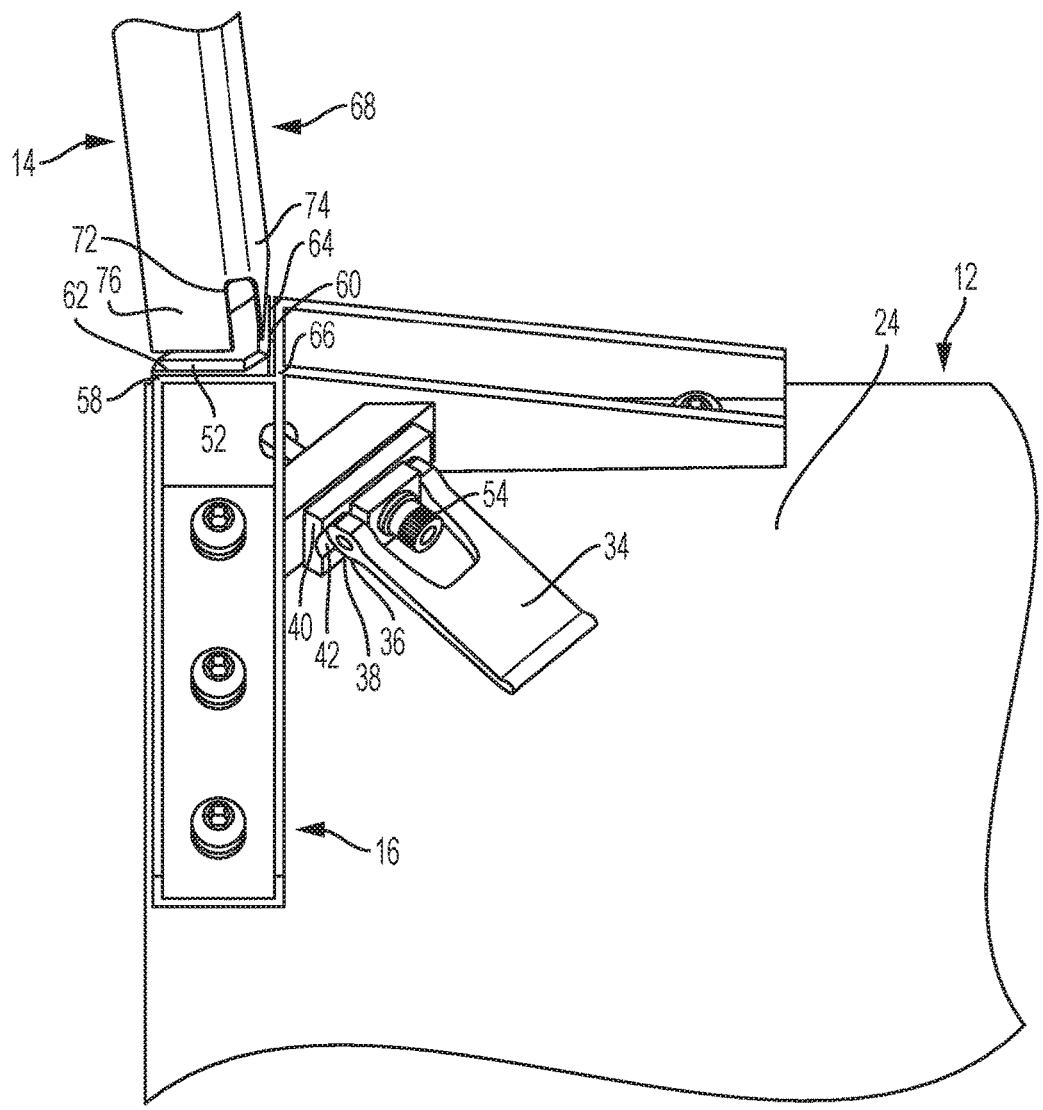
FIG. 8 is a perspective view of the leg of FIG. 7 being installed on the latching device of FIG. 5.

Referring now to FIG. 7, a perspective view of a table leg 14 is shown. The table leg 14 may have a proximal end 68 and a distal end 70. The proximal end 68 may engage the latching device 16 (FIG. 6). For example, at least the proximal end 68 of the table leg 14 may define a hollow interior portion that can receive the retaining wedge 52. The proximal end 68 may additionally include a slot 72 provided at a corner of a first leg surface 74 and a second leg surface 76. The slot 72 may pass into hollow interior portion of the table leg 14 to allow the shaft (FIG. 6) to extend therein. The distal end 70 of table leg 14 may include foot 78 for resting on a floor or other surface. The foot 78 may be adjustable (e.g., using a threaded connection) and allow for height adjustment of each individual table leg 14. The foot 78 may allow for adjustment of each individual table leg 14 to level the table top 12 (FIG. 1). Although a substantially square or rectangular table leg 14 is depicted, other shapes of table leg 14 are contemplated. The table legs 14 may comprise any material capable of supporting table top 12, such as wood, plastic, metal, composite, etc., or any combination thereof.

Referring now to FIGS. 8-11, assembly of the table 10 (FIG. 1) will be described. The table 10 may be provided to a user with the latching devices 16 attached to the lower surface 24 of the table top 12. The one or more table legs 14 may be provided detached from the table top 12. In this manner, the table 10 may be permitted to be packaged, shipped, delivered, and/or stored in a compact manner with the table legs 14 in a detached position. When the table 10 is desired to be used, the table legs 14 may be coupled to the table top 12 using one or more latching devices 16. Although only one latching device 16 and one table leg 14 are depicted in FIGS. 8-11, it will be appreciated that a latching device 16 and corresponding table leg 14 may be provided in each corner of the table top 12.

To couple the table legs 14 to the table 10, a top surface (not depicted) of the table top 12 may be placed on a flat surface with the latching devices 16 and lower surface 24 facing upward. In the first step of FIG. 8, the draw latch 34 may be in a generally horizontal position resting on the lower surface 24. Although, the draw latch 34 may be provided in the generally vertical position (FIG. 9) at this stage. The proximal end 68 of the table leg 14 may be aligned with the corner notch defined by the corner bracket portion 30c (FIG. 6) such that the slot 72 faces the corner 66 of the bracket 30. In this position, the surfaces 60, 64, and 74 of the bracket 30, retaining wedge 52, and table leg 14, respectively, are generally parallel to one another. The surface 74 of the table leg 14 may be located substantially between the surfaces 60 and 64 of the bracket 30 and retaining wedge 52, respectively. Similarly, the surfaces 58, 62, and 76 of the bracket 30, retaining wedge 52, and table leg 14, respectively, are generally parallel to one another. The surface 76 of the table leg 14 may be located substantially between the surfaces 58 and 62 of the bracket 30 and retaining wedge 52, respectively.

Figure 9:
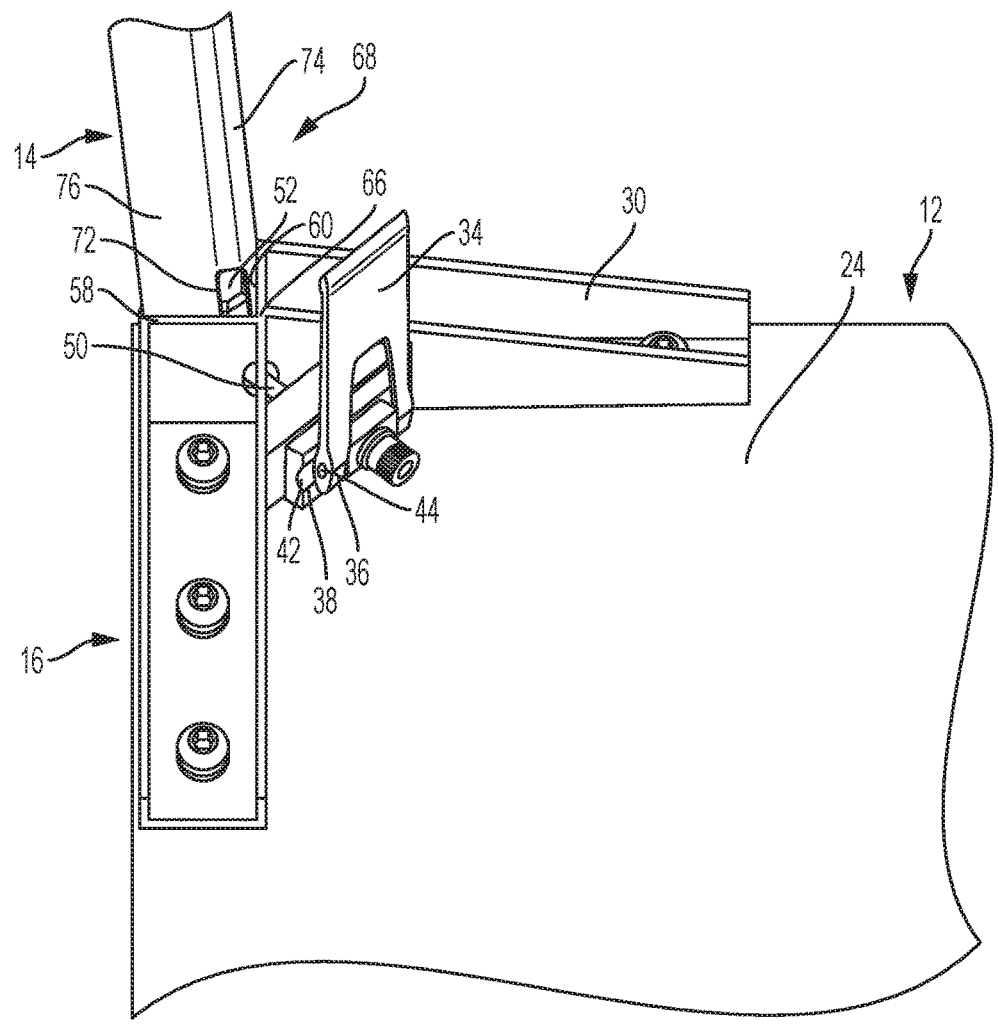
FIG. 9 is a perspective view of the leg of FIG. 7 being installed on the latching device of FIG. 5.

Referring to FIG. 9, the draw latch 34 is shown in the unsecured position which may correspond to the vertical position. To move from the secured, horizontal position of FIG. 8 to the unsecured, vertical position of FIG. 9, the user may rotate the draw latch 34 to cause the cam surface 38 to rotate relative to the cam follower surface 42 of the cam follower 40. In the unsecured position, the retaining wedge 52 is offset or spaced from the bracket 30 such that a gap is provided between the retaining surfaces 62 and 64 of the retaining wedge and the corresponding surfaces 58 and 60 of the bracket 30, respectively. The gap is large enough to allow insertion of the table leg 14 into the corner notch. After aligning the surfaces as previously described with respect to FIG. 8, the table leg 14 may be lowered into the gap such that an end surface (not depicted) of the proximal end 68 rests on or is located near the upper surface of the corner bracket portion 30c (FIG. 6). Alternatively, the end surface (not depicted) of the proximal end 68 may rest directly on the surface 24 of the table top 12. The slot 72 in leg 14 may be aligned with the shaft 50. When the table leg 14 is lowered, the slot 72 may extend around the shaft 50 to allow the end surface of the table leg 14 to be near or touching the corner bracket portion 30c. In this manner, the shaft 50 does not interfere with the placement of the table leg 14 in the corner notch in bracket 30. The table leg 14, or at least the proximal end 68 of the table leg 14, may be hollow to accommodate the retaining wedge 52 during coupling of the table leg 14 to the table top 12.

Figure 10:
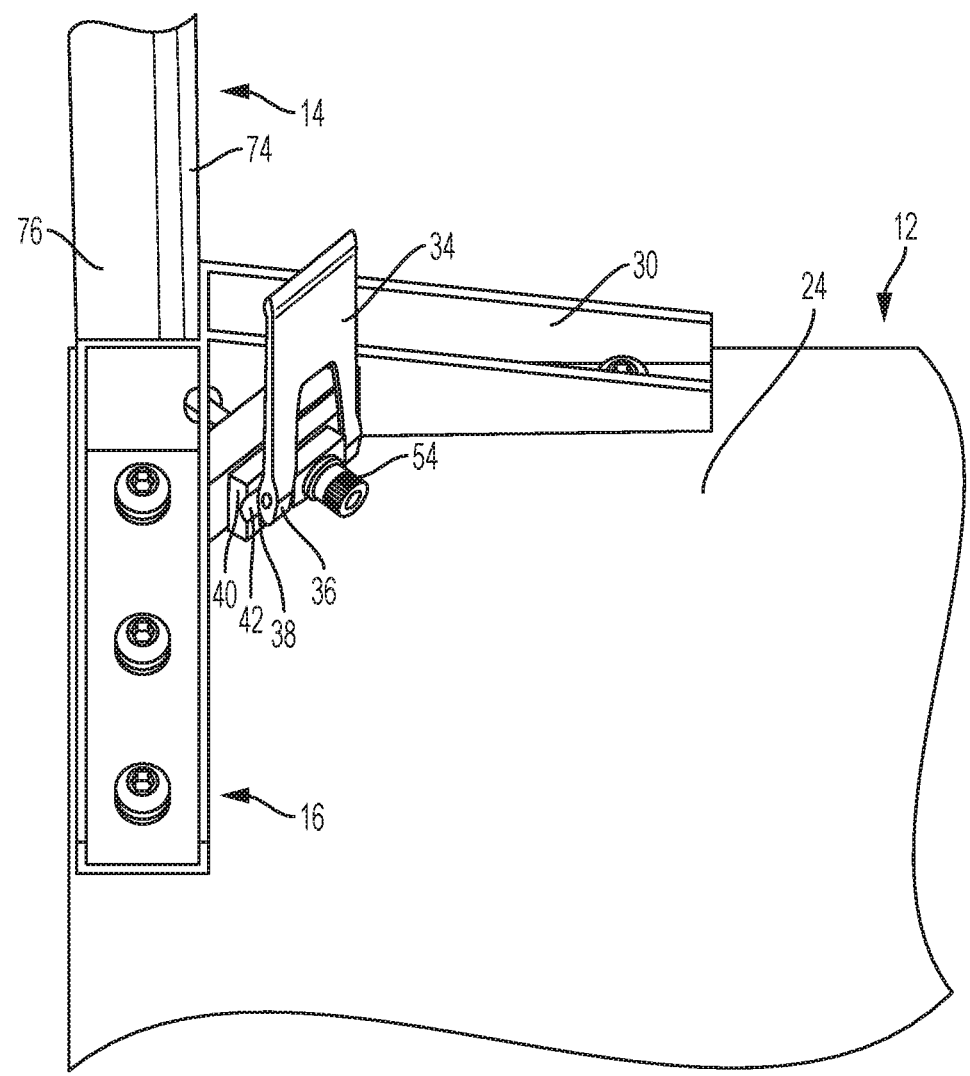
FIG. 10 is a perspective view of the leg of FIG. 7 being installed on the latching device of FIG. 5.

With reference to FIG. 10, the table leg 14 may be fully inserted into the gap between retaining wedge 52 (FIG. 9) and bracket 30 until the table leg 14 is in a substantially vertical position that is substantially perpendicular to the table top 12. With the draw latch 34 in the substantially vertical position, the retaining wedge 52 is still spaced away from the bracket 30 such that the gap between the retaining wedge 52 and bracket 30 is large enough to allow movement of the table leg 14 back and forth and into and out of the corner bracket portion 30c. Thus, although properly aligned in FIG. 10, the table leg 14 may still be moved around in the gap between the retaining wedge 52 (FIG. 6) and bracket 30. In the position of FIG. 10, the table leg 14 is not secured to the bracket 30.

Figure 11:
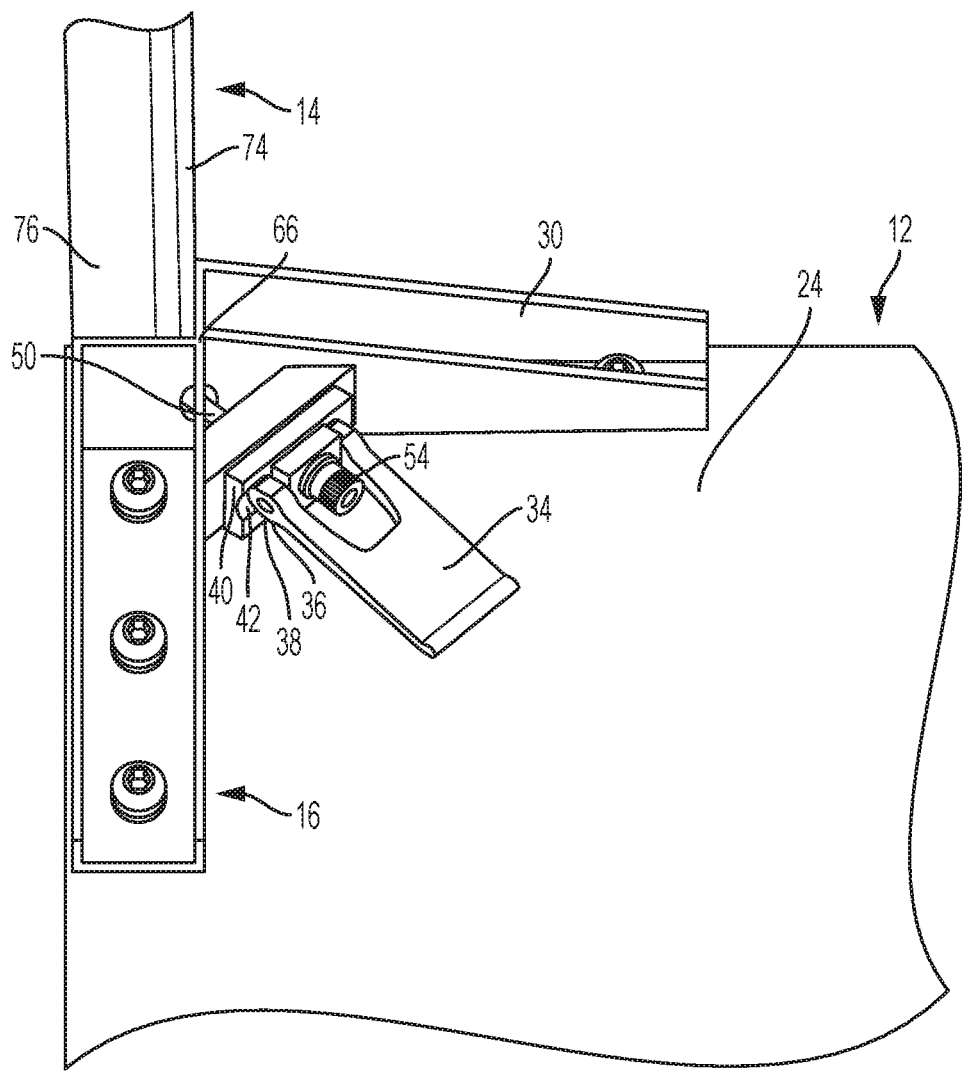
FIG. 11 is a perspective view of the leg of FIG. 7 being installed on the latching device of FIG. 5.

To secure the table leg 14, the user may move the draw latch 34 from the substantially vertical position of FIG. 10 to the substantially horizontal position of FIG. 11. As may be appreciated from FIG. 11, during movement of the draw latch 34, the cam surface 38 moves with respect to the cam follower 42 of the cam follower 40. Due to the eccentric nature of the cam surface with respect to the shaft 50, the movement of the draw latch 34 causes lateral movement of the shaft 50 and retaining wedge 52 connected thereto. The movement of the draw latch 34 pulls the shaft 50 and thus the retaining wedge 52 (FIG. 6) inward toward the corner 66 of the bracket 30. With the retaining wedge 52 drawn inward, the gap between the retaining wedge 52 and the bracket 30 becomes smaller (the "first distance"). In the secured position of FIG. 11, the surfaces 74 and 76 of the table leg 14 are gripped or secured between the retaining surfaces 62, 64 of the retaining wedge 52, and the corresponding surfaces 58 and 60 of the bracket 30 (FIG. 6). In this position, the table leg 14 is prevented from moving in the gap between the retaining wedge 52 and the bracket 30. The table leg 14 is now secured to the bracket 30 and thus to the table top 12.

The force applied to the table leg 14 by the retaining wedge 52 may be adjusted by turning the tensioning knob 54, which adjusts the distance between the draw latch 34 and the retaining wedge 52. Before the draw latch 34 has been moved to the secured position of FIG. 11, the tensioning knob 54 may be turned to adjust the degree to which the retaining wedge presses the surfaces of the table leg 14 against the bracket 30. The tensioning knob 54 may draw the shaft 50 and thus the retaining wedge 52 closer to the corner 66 by engaging the threaded surface 56 (FIG. 5). Once the table leg 14 is secured in place in the bracket 30, the steps may be performed on the remaining table legs 14 until all table legs 14 are properly secured to the table top 12. After all the table legs 14 are secured to the table top 12, the table 10 may be rotated such that the feet 78 (FIG. 7) of the table legs 14 are located on the floor or other surface on which the table 10 is placed. The feet 78 may then be individually adjusted to provide a level table top 12.

Figure 12:
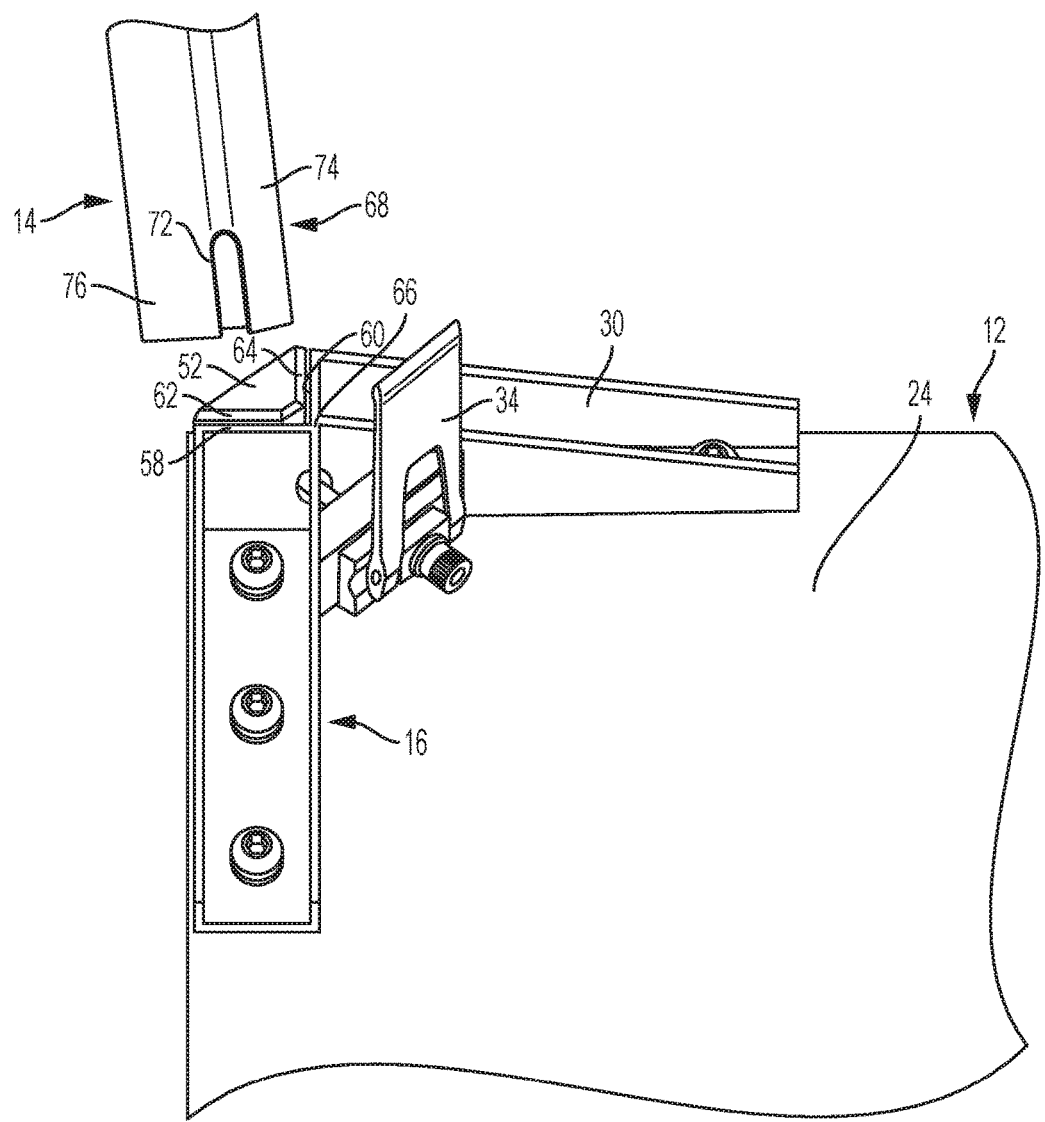
FIG. 12 is a perspective view of the leg of FIG. 7 being removed from the latching device of FIG. 5.

To disassemble the table 10 for storage, transportation, or other reasons, the table 10 may be rotated such that the top surface of the table top 12 is placed on the floor or other flat surface. The table legs 14 may then be removed from the table top 12. The process to remove the table legs 14 may be substantially reversed from the process described in FIGS. 8-11. In order to remove the table legs 14, the draw latch 34 may be moved from the secured, horizontal position of FIG. 11 to the unsecured, vertical position of FIG. 12. When the draw latch 34 is moved to the vertical position, the retaining wedge 52 is moved away from the corner 66. The gap provided between the retaining wedge 52 and the bracket 30 becomes larger (the "second distance") allowing for movement or removal of the table leg 14. In this position, the table leg 14 may be moved upward to be removed from the corner bracket portion 30c (FIG. 5) between the surfaces 58 and 60. This process may be repeated with the remaining table legs 14 until all of the table legs 14 have been removed from the table top 12. The table 10 may now be moved or stored as desired. It will be appreciated from the foregoing that the table may be assembled and disassembled any number of times in any number of locations, as desired by the user.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A table, comprising:
   a table top;
   a bracket secured to the table top;
   a latching device coupled to the bracket, the latching device having a retaining wedge coupled to a draw latch via a cam device and a shaft; and
   a table leg,
   wherein the draw latch is configured to pivot with respect to a cam follower of the cam device to laterally move the shaft and the retaining wedge connected thereto between a first position securing the table leg to the bracket and a second position unsecuring the table leg from the bracket.

2. The table of claim 1, the cam device comprising a cam surface and the cam follower, wherein the cam surface is disposed on the draw latch and the cam follower is in contact with the cam surface, wherein movement of the draw latch rotates the cam surface on the cam follower to move the retaining wedge between the first position and the second position, and wherein in the first position, a first side of the cam surface abuts the cam follower and in the second position, a second side of the cam surface abuts the cam follower.

3. The table of claim 1, wherein the shaft passes through an aperture in the bracket.

4. The table of claim 2, wherein the cam surface is eccentrically disposed with respect to the shaft.

5. The table of claim 1, the shaft including a threaded portion, wherein the latching device further comprises a tensioning knob secured to the threaded portion to adjust a position of the retaining wedge with respect to the draw latch.

6. The table of claim 1, the table leg defining a slot, wherein the slot is configured to receive the shaft when the table leg is secured to the bracket.

7. The table of claim 1, wherein:
   when the retaining wedge is in the first position, a retaining surface of the retaining wedge engages a surface of the table leg against a surface of the bracket, and
   when the retaining wedge is in the second position, the retaining surface of the retaining wedge is disengaged from the surface of the table leg.

8. The table of claim 1, wherein the bracket defines a corner recess for receipt of the table leg, and when the retaining wedge is in the first position, a retaining surface of the retaining wedge engages the table leg against the corner recess.

9. The table of claim 8, wherein the table leg defines a hollow interior portion adapted to receive the retaining wedge.

10. A latching device, comprising:
    a bracket;
    a draw latch defining a cam surface;
    a cam follower in contact with the cam surface; and
    a retaining wedge coupled to the draw latch by a shaft passing through an aperture in the bracket,
    wherein the draw latch is configured to pivot with respect to the cam follower to laterally move the shaft and the retaining wedge connected thereto between a first position spaced a first distance from the bracket to a second position spaced a second distance from the bracket.

11. The latching device of claim 10, wherein the cam surface is eccentrically disposed with respect to the shaft.

12. The latching device of claim 10, wherein the first distance is smaller than the second distance.

13. The latching device of claim 10, further comprising a table leg, wherein:
    when the retaining wedge is in the first position, a retaining surface of the retaining wedge engages a surface of the table leg against a surface of the bracket, and
    when the retaining wedge is in the second position, the retaining surface of the retaining wedge is disengaged from the surface of the table leg.

14. The latching device of claim 13, wherein the bracket defines a corner recess for receipt of the table leg, and when the retaining wedge is in the first position, a retaining surface of the retaining wedge engages the table leg against the corner recess, further wherein the table leg defines a hollow interior portion adapted to receive the retaining wedge, and the table leg defines a slot configured to receive the shaft.

15. A method for securing a leg to a table, the method comprising:
    providing a table top having a bracket and a latching device coupled to the bracket, wherein the latching device comprises a draw latch coupled to a retaining wedge with a shaft;
    aligning a table leg with the retaining wedge of the latching device;

lowering the table leg onto the retaining wedge, whereby the retaining wedge enters a hollow interior portion of the table leg; and pivoting the draw latch with respect to a cam device to laterally move the shaft and the retaining wedge connected thereto to a secured position to engage the table leg between the retaining wedge and the bracket.

16. The method of claim 15, wherein lowering the table leg onto the retaining wedge further comprises inserting the table leg into a corner recess defined in the bracket.

17. The method of claim 15, wherein lowering the table leg onto the retaining wedge further comprises receiving the shaft in a slot defined in the table leg.

18. The method of claim 15, wherein pivoting the draw latch of the latching device to a secured position comprises moving a cam surface associated with the draw latch against a cam follower associated with the bracket, the cam surface moving between a first position where a first side of the cam surface abuts the cam follower and a second position where a second side of the cam surface abuts the cam follower.

19. The method of claim 15, wherein in the secured position, a surface of the table leg is engaged between a retaining surface of the retaining wedge and a surface of the bracket, and in an unsecured position, the surface of the table leg is released from between the retaining surface of the retaining wedge and the surface of the bracket.

\* \* \* \* \*